US006986404B1

(12) United States Patent
Laborde

(10) Patent No.: US 6,986,404 B1
(45) Date of Patent: Jan. 17, 2006

(54) HUNTER'S CLIMBING TREE STAND AND METHOD OF USE

(76) Inventor: James J. Laborde, 6020 Lorraine St., Metairie, LA (US) 70003

( * ) Notice: Subject to any disclaimer, the term of this patent is extended or adjusted under 35 U.S.C. 154(b) by 24 days.

(21) Appl. No.: 10/610,512

(22) Filed: Jun. 30, 2003

Related U.S. Application Data

(63) Continuation-in-part of application No. 10/127,263, filed on Apr. 22, 2002.

(60) Provisional application No. 60/392,855, filed on Jul. 1, 2002.

(51) Int. Cl.
*A01M 31/00* (2006.01)

(52) U.S. Cl. .......................................... 182/135

(58) Field of Classification Search ................ 182/135, 182/136, 188, 182
See application file for complete search history.

(56) References Cited

U.S. PATENT DOCUMENTS 4,124,094 A 11/1978 Cande
4,205,733 A 6/1980 Wade
5,090,504 A 2/1992 Amacker
5,097,925 A 3/1992 Walker, Jr.
5,234,076 A 8/1993 Louk et al.
5,316,104 A 5/1994 Amacker
5,688,153 A * 11/1997 Yeung ........................ 441/132
5,921,348 A 7/1999 Louk et al.
6,082,492 A 7/2000 Yerger
6,182,792 B1 2/2001 Woller et al.
6,206,138 B1 3/2001 Yerger
6,264,000 B1 7/2001 Johnson
6,595,325 B2 7/2003 Ulrich

OTHER PUBLICATIONS

Boxscores & Beanfie, Oct. 2000 catalog, Outland Sports, Inc.
Spinlock 2002 catalog, various.
Ol'Man Treestands 2002 catalog.
Advertisements from Deer & Deer Hunting, Oct. 2000.

* cited by examiner

*Primary Examiner*—Alvin Chin-Shue
(74) *Attorney, Agent, or Firm*—Garvey, Smith, Nehrbass & Doody, L.L.C.; Charles C. Garvey, Jr.

(57) ABSTRACT

A climbing tree stand apparatus provides upper and lower platforms that are independently movable up the tree by the hunter alternatively sitting and standing on one or the other of the platforms. In order to adjust the angular position of a selected platform relative to the tree, an easily accessible adjustable anchor point is provided. This anchor point enables a cable associated with each platform to be lengthened or shortened in order to maintain the orientation of the platforms in a nearly horizontal position.

12 Claims, 9 Drawing Sheets

HUNTER'S CLIMBING TREE STAND AND METHOD OF USE

CROSS-REFERENCE TO RELATED APPLICATIONS

This is a continuation-in-part of co-pending U.S. patent application Ser. No. 10/127,263, filed Apr. 22, 2002, which is incorporated herein by reference.

Priority of U.S. Provisional Patent Application Ser. No. 60/392,855, filed Jul. 1, 2002, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to elevated hunting platforms, particularly tree climbing devices such as those that are commonly employed by deer hunters. More particularly, the present invention relates to an improved climbing tree stand having upper and lower platforms, either or both having an adjustment system that enables a user to quickly and safely adjust the position of either or both of the platforms relative to the tree being climbed. The present invention enables a hunter to always maintain his or her tree stand climbing platforms in as close to a horizontal position as possible, during climbing and even with changes in tree diameter due to natural tree taper.

2. General Background of the Invention

Hunters commonly employ a climbing tree stand when hunting certain game animals such as white tailed deer, mule deer, hogs, elk, and the like. These climbing tree stands enable a hunter to hunt from a position that is 10–40 feet above the ground to hopefully avoid detection by the game animal. Game animals such as deer have a very keen sense of smell. Deer also have very good eyesight. Hunting from an elevated position can assist the hunter when hunting such game animals.

Several climbing tree stands are commercially available. Some of these designs have been patented. One of the most popular designs is sold by Ol' Man Tree Stands, Inc. of Hattiesburg, Miss. One of the Ol' Man designs is shown and described in U.S. Pat. No. 5,234,076 issued to Louk and entitled "Tree Stand". An improvement to the basic '076 patent can be seen in a later U.S. Pat. No. 5,921,348 wherein the tree stand converts between selected positions that are suited to either bow hunting or rifle hunting.

The Louk U.S. Pat. Nos. 5,234,076 and 5,921,348 each employ flexible cables that extend about a tree during use and which have end portions that attach to upper and lower platform or frame sections of the stand. In the Louk '076 and '348 patents, the ends of the cables have eyelets that are contained within hollow bar members of the frame sections. Each of the cable eyelets is locked to a selected position with locking pins. The locking pins pass through holes in the hollow bar members of the frame and then through the cable eyelets. The pins thus affix the length of the cable at a selected position, depending upon the diameter of the tree being climbed. Adjustment while climbing is difficult or impossible because a hunter must manipulate three items simultaneously: the platform, the cable, and the locking pin. Any one of these can become unsecured during an attempted adjustment.

Some climbing stands employ rigid metal straps that extend around the tree such as those shown and described in the Amacker U.S. Pat. Nos. 5,090,504 and 5,316,104.

API Outdoors of Tallulah, La. manufactures and sells a tree stand that uses a flexible chain that extends about the tree to secure each platform. Otherwise, locking pins like the Louk devices present the same problem for any adjustment. The Yerger U.S. Pat. No. 6,082,492 discloses a safety belt for a climbing tree stand that includes a chain. Another Yerger patent 6,206,138 uses a chain as part of the climbing cable mechanism.

Many commercially available tree stands are sold by Cabela's, Inc. of Sidney Nebr. These various tree stand designs can be seen at the Cabela's website (www.cabellas-.com). Bass Pro Shops also sells numerous climbing tree stand designs. The various climbing tree stands that are sold by Bass Pro Shops can be seen at their website (www-.basspro-shops.com).

One of the problems that has long plagued the art relates to the adjustment of a climbing tree stand relative to the tree selected. When a hunter selects a particular area for a hunt, there may be only a few tall straight trees that are suitable for the attachment of a climbing tree stand. A hunter typically does not have a wide range of selections as to the diameter of the tree if a particular spot is to be hunted. The cable must be adjusted before the hunter begins to ascend the tree for the hunt. Often, the hunter is placing the stand on the tree in total darkness. This is quite common with early morning hunts because the hunter wants to be in position before daylight.

Trees are typically tapered, having a wider base and a narrow top. This presents a problem to the hunter that is using a tree climbing stand employing cables. As the hunter climbs the tree, the position of the cables relative to the stand platform frame portions remains fixed, causing the inclination of the tree stand platforms relative to the tree to change with changing tree taper. Ideally, the platforms are horizontal and form a right angle (90°) with the tree. When the platform angle is not at or near ninety degrees, the hunter is basically standing or sitting on an inclined rather than horizontal surface. Typically, as the tree narrows, the climbing platforms form greater and greater obtuse angles with that portion of the tree that extends above the platforms.

Prior art tree stands use locking pins or bolts to lock the cable to the stand. These locking cables are virtually impossible to adjust during climbing. To remove one of the locking pins creates a potentially disastrous situation wherein the user could drop the locking pin, rendering the stand inoperable and trapping the hunter twenty or thirty feet above ground level. Further, the hunter is at risk of falling because one hand must support a portion of the platform that is not supporting the hunter while the other hand attempts to make the adjustment. Few safe hunters ever attempt such an adjustment during climbing.

BRIEF SUMMARY OF THE INVENTION

A tree stand platform apparatus includes one or two platforms that can be attached to a tree during use. When two platforms are used, the apparatus provides a climbing tree stand that enables a hunter to climb a tree with the apparatus and assume a position that is elevated for hunting. The apparatus includes a first platform with foot attachments for enabling a connection to be made between the first platform and a user's feet. A second platform is positioned above the first platform during use when climbing a tree. Each platform has a flexible cable that enables connection to the tree being climbed, wherein the cable has two free ends, one end attached to the left side of a platform, the other attached to the right side of a platform. The cable extends about a tree being climbed during use relative to the platform to which the cable is attached. An adjustment enables a user to adjust the length of the cable that extends from the platform to the tree, the adjustment being free of any separate locking pin. The adjustment enables a user to adjust the length of the cable that extends from the platform to the tree and can include at least one knot tied to the cable at a selected position that is spaced away from the tree, the knot providing a stop to limit the length of the cable that extends from the platform to the tree. The present invention also provides an improved method of climbing a tree with a climbing tree stand wherein a user can easily adjust the position of the tree stand platforms relative to the tree without requiring manipulation of: 1) the platform; 2) the cable; 3) a separate locking member.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
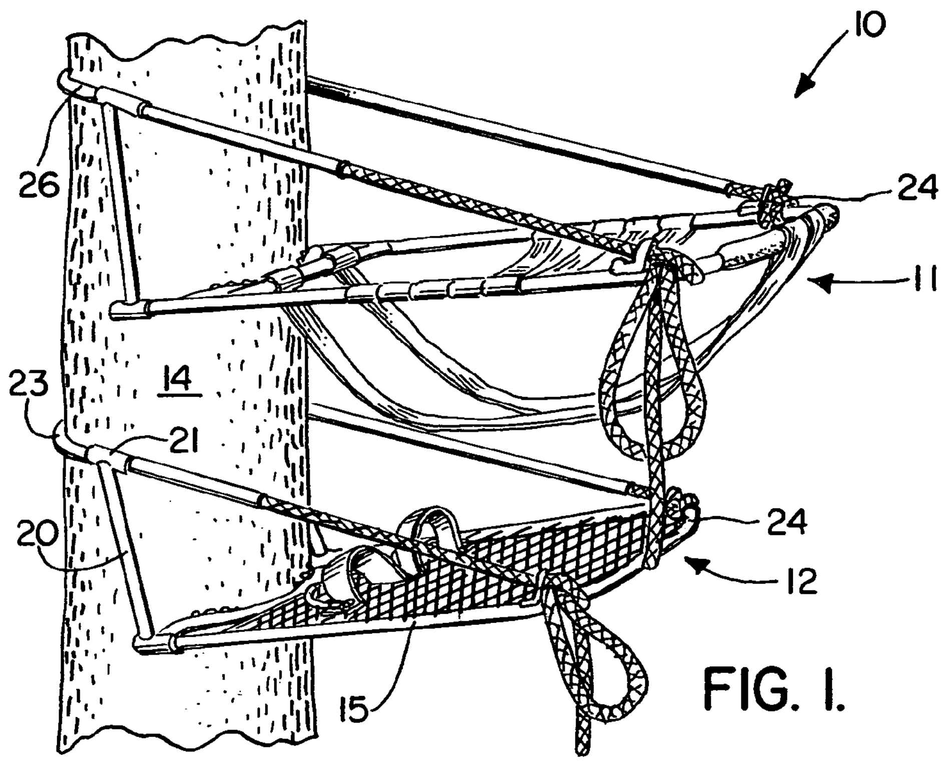
FIG. 1 is a perspective view of the preferred embodiment of the apparatus of the present invention showing the climbing tree stand secured to a tree just prior to its use by a hunter to climb a tree.
Figure 2:
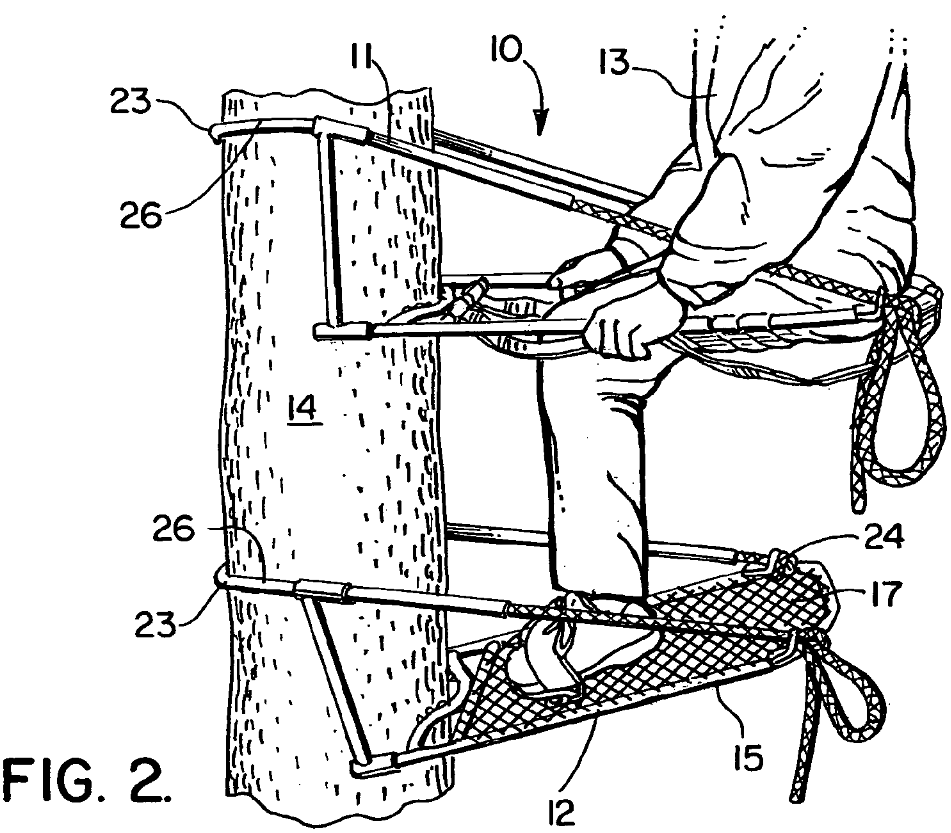
FIG. 2 is a perspective view of the preferred embodiment of the apparatus of the present invention showing the hunter in operative position and just prior to initiating a climb.
Figure 3:
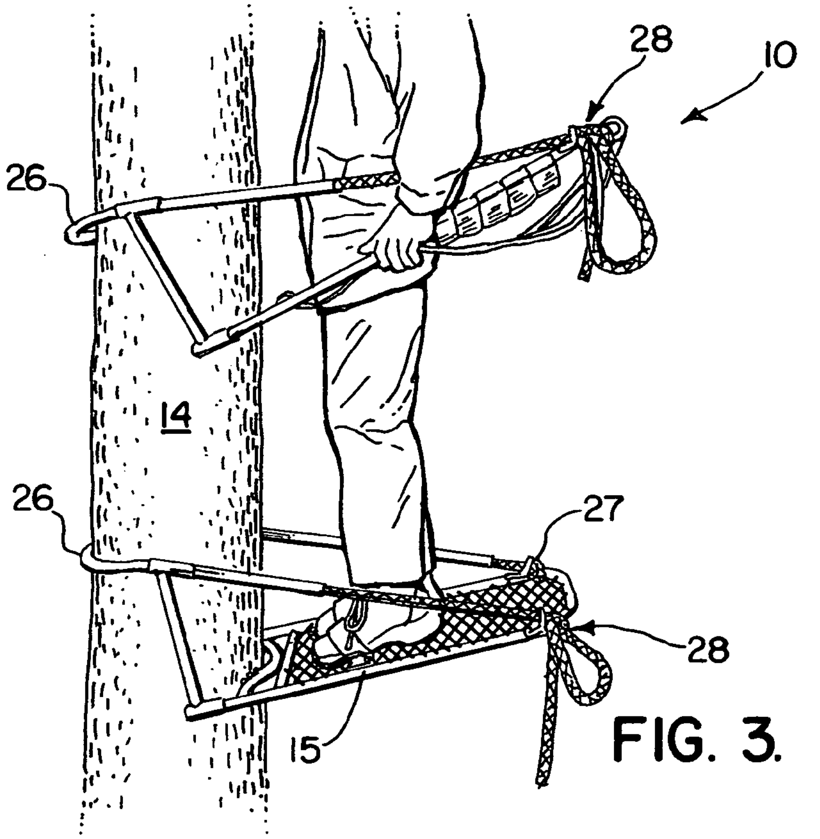
FIG. 3 is a perspective side view of the preferred embodiment of the apparatus of the present invention showing a hunter during climbing wherein the lower platform is fixed and the upper platform is being elevated.
Figure 4:
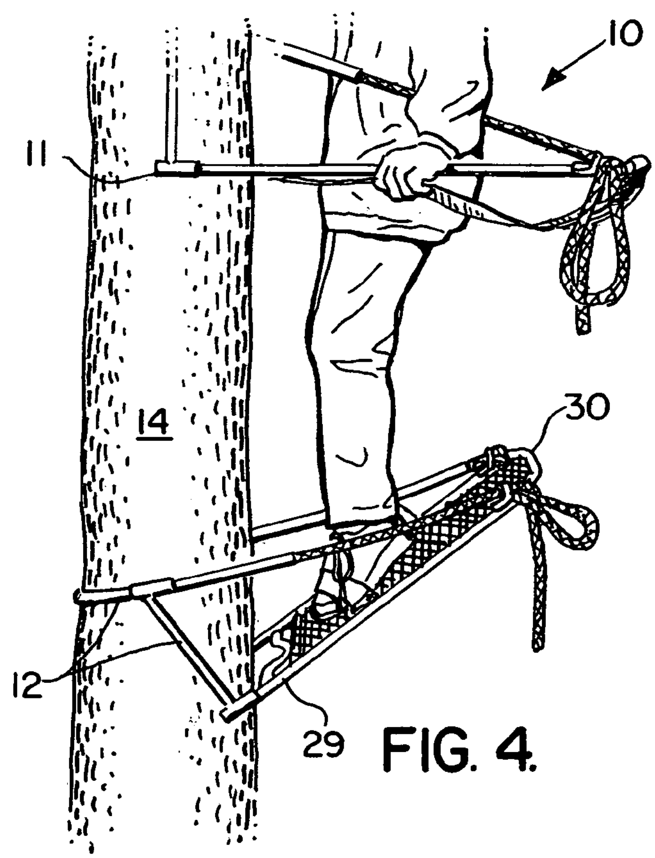
FIG. 4 is a side perspective view of the preferred embodiment of the apparatus of the present invention showing a hunter during climbing with the apparatus and wherein the upper platform is fixed and the lower platform is being elevated.

FIGS. 1–4 show the preferred embodiment of the apparatus of the present invention designated generally by the numeral 10. Climbing tree stand apparatus 10 is shown in FIGS. 1–4, attached to a tree 14 that is to be climbed by a hunter 13. The hunter 13 attaches his or her feet to the lower platform 12 while holding the upper platform 11 with his or her hands as shown in FIGS. 2–4.

Climbing is accomplished by alternatively locking the upper 11 or lower 12 platform to the tree by engaging the tree with a central portion 24 of cable 22 and simultaneously locking or engaging a blade 16, 34 or another contact point provided on each of the platforms 11, 12 into the tree. That engaged position of the lower platform can be seen in FIGS. 3 and 5. Each of the upper and lower platforms 11, 12 attaches to the tree in the same fashion with the selected platform 11, 12 having a blade 16, 34 or another contact point that digs into the tree or engages the tree while the central portion 26 of the cable 22 encircles and holds the platform 11 or 12 to the tree 14.

In general, this concept of using upper and lower platforms having cables that encircle a tree and having blades, teeth or other contact point(s) that engage the tree is well known in the art. For example, climbing tree stands that feature upper and lower platforms can be seen in the prior Amacker U.S. Pat. Nos. 5,316,104 and 5,090,504 as well as the prior Louk U.S. Pat. Nos. 5,234,076 and 5,921,348, all of which are hereby incorporated herein by reference.

One of the problems that faces a hunter during the climbing of a tree is that of proper platform position relative to the tree. As shown in FIG. 2, the platforms 11, 12 desirably form an angle of about 90 degrees with respect to the tree 14 being climbed. The upper platform 11 has a seat that is desirably horizontal during use. The lower platform 12 has a deck for standing that is desirably horizontally positioned. However, since trees are tapered, as the hunter elevates the platforms 11, 12 during climbing, the taper of the tree causes the platform to assume a position that is not always horizontal. This presents an unstable, uneven platform for the hunter making it difficult to stand on the bottom platform 12 such as during shooting a rifle or a bow. Likewise, if the upper platform 11 is not at a generally 90 degree angle with respect to the tree, the hunter is in an awkward, uncomfortable position. If the hunter angles the platform 11 or 12 initially to form an acute angle with the tree, climbing is awkward as the platforms 11, 12 are not perfectly horizontal until fully elevated, assuming that the hunter estimates the initial starting angle with a high degree of success.

The present invention provides a solution to this problem by enabling the hunter to quickly and easily adjust the length of the cable 22 that encircles the tree 14 and therefore insure at all times that the platform 11 or 12 will be generally horizontally positioned and forming an angle of about 90 degrees with respect to the tree 14 being climbed.

Figure 5:
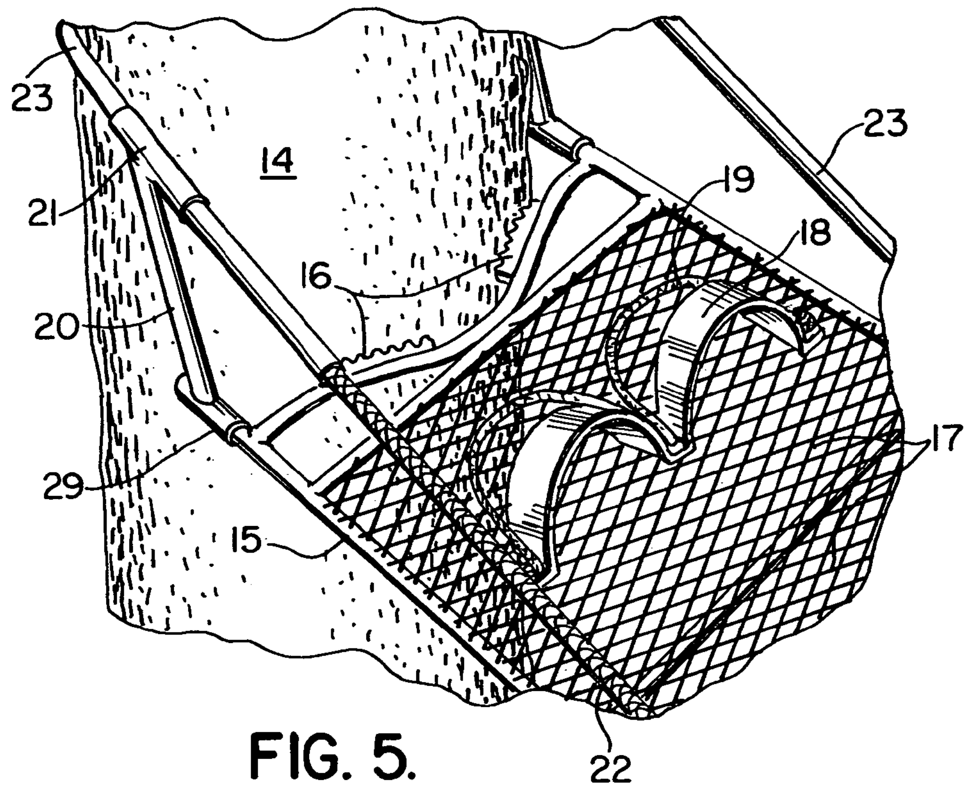
FIGS. 5–5A are partial perspective views of the preferred embodiment of the apparatus of the present invention showing the lower platform portion thereof.

The lower platform 12 provides a frame 15 having decking or flooring 17 that enables a hunter to stand upon the lower platform 12. The flooring 17 can be expanded metal, transverse bars or the like. A blade 16 or blades or other contact point are provided on the frame 15 as shown in FIG. 5 for engaging the tree 14 being climbed. The blades 16 can be toothed, spiked, straight or smooth. Foot attachments 18 enable a hunter 13 to attach his or her feet to the lower platform 12 so that it can be lifted when the hunter 13 supports his or her weight with hands as shown in FIG. 4. This enables the hunter 13 to hold onto the upper platform 11 while lifting the lower platform 12, as shown in FIG. 4. Elastic straps 19 can be provided for helping the hunter 13 hold his or her feet in the straps 18. Typically, the elastic straps 19 would be fastened behind the hunter's shoes at the heel area.

Each of the frames 11 and 12 provides left and right upwardly extending struts 20. These struts 20 can be rigidly attached to the remaining portion of the frame 15, 31 by welding or can be pivotally attached such as those shown in the Louk U.S. Pat. No. 5,234,076, incorporated herein by reference. Each of the upwardly extending struts 20 provides an eyelet 21 through which cable 22 extends. The cable 22 can provide a flexible cover 23 to prevent abrasion and chaffing for that portion of the cable 22 that extends through the eyelets 21 and around the tree 14. Cable 22 can be of a rope material (eg. Kevlar®, Spectra®).

Figure 6:
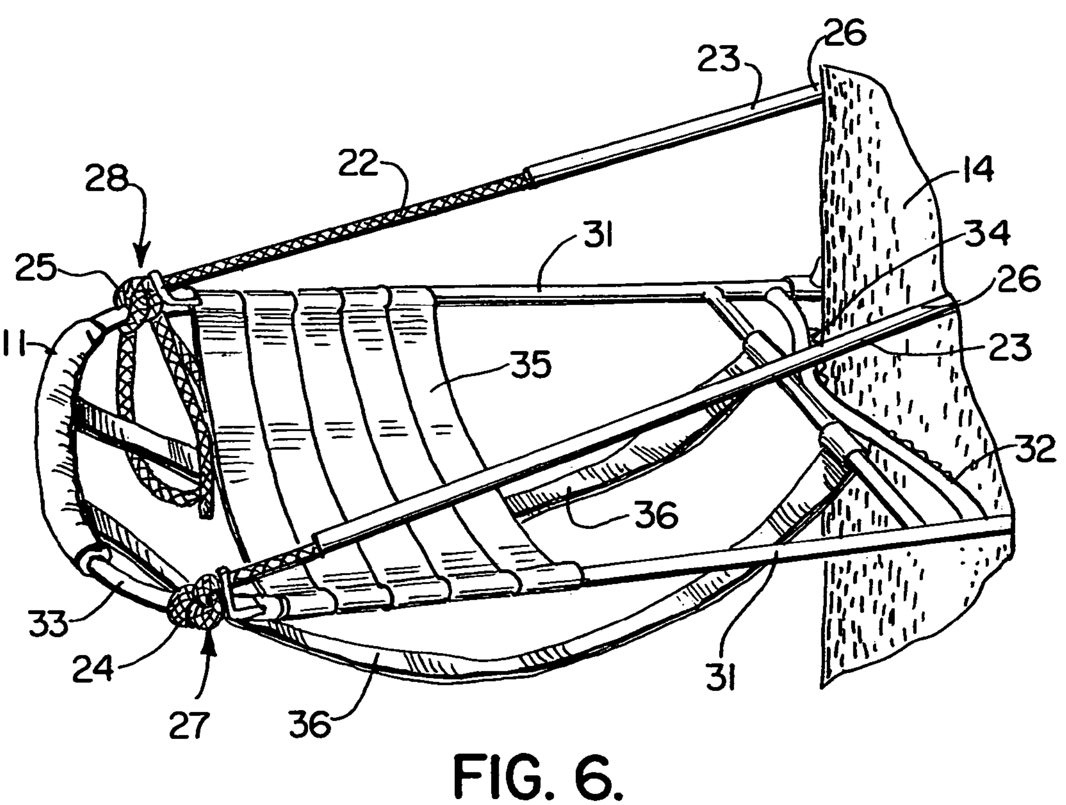
FIGS. 6–6A are partial perspective views of the preferred embodiment of the apparatus of the present invention showing the upper platform portion thereof.
Figure 6A:
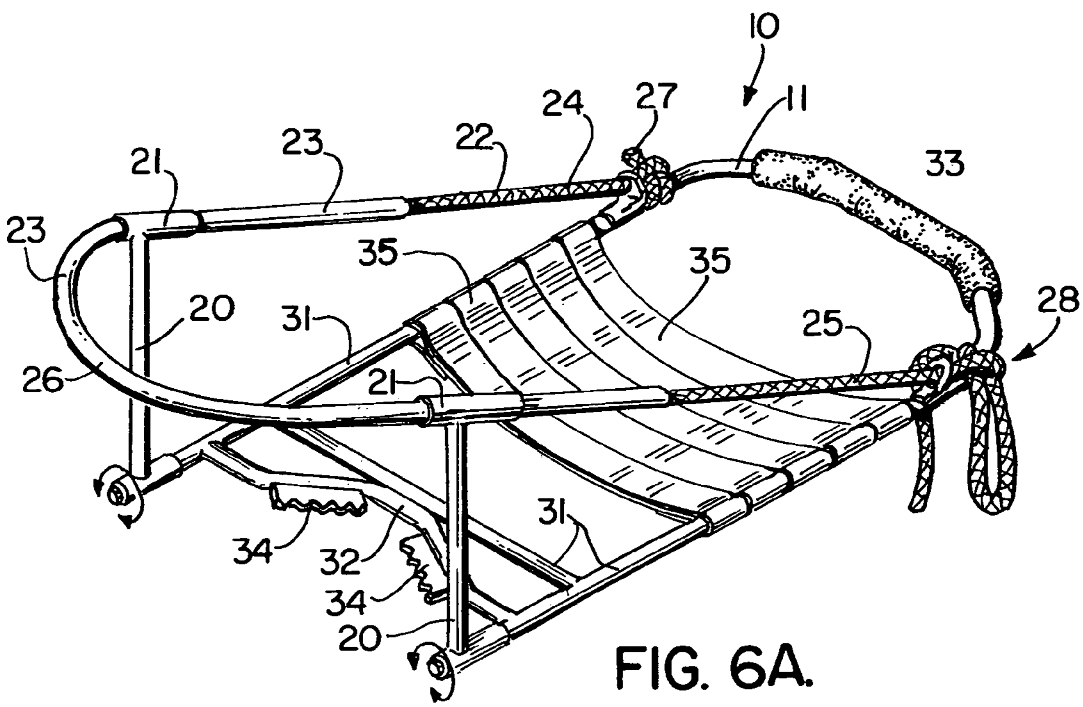
Figure 5A:
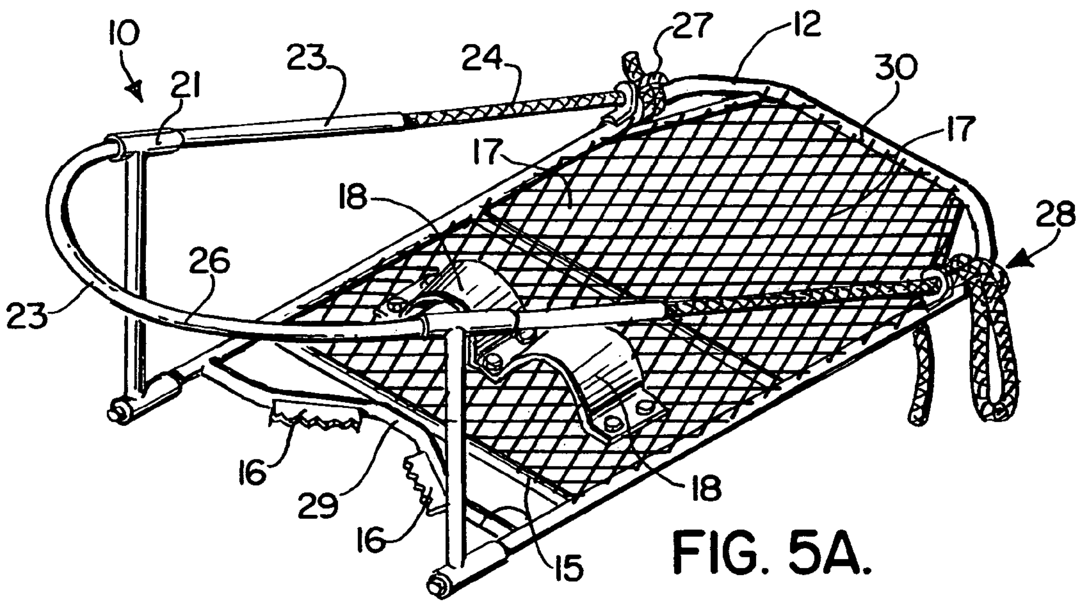

Cable 22 provides a first end portion 24, a second end portion 25 and a central portion 26. The central portion 26 extends from the platforms 11, 12 around the back of the tree 14 opposite the hunter 13 as shown in FIGS. 2, 3 and 4. The first end portion 24 of cable 22 is attached to frame 15 or 31 providing an anchor point 27 as shown in FIG. 6.

An adjustable anchor point 28 is provided at second end portion 25 of cable 22. This second end portion 25 and the adjustable anchor point 28 enables a hunter 13 to change the length of the cable 22 that extends from first end portion 24 and anchor point 27 about the tree 14 and then to anchor point 28. The anchor points 27, 28 are preferably provided at the outer end portions 30, 33, of the platforms 12, 11. The frame 15 thus provides an inner end 29 and an outer end 30. The platform 31 provides an inner end 32 and an outer end 33. It should be understood that the cable 22, flexible cable cover 23, and anchor points 24, 25 can be of the same diameter, length, and material for upper platform 11 and lower platform 12.

Figure 7:
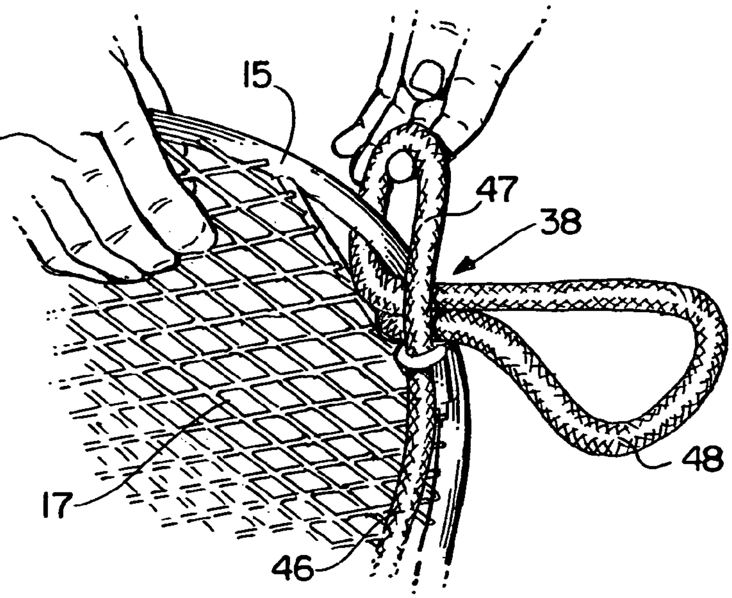
FIGS. 7, 8 and 9 are fragmentary perspective views of the preferred embodiment of the apparatus of the present invention illustrating adjustment of the cable for changing the angular position of a platform relative to the tree being climbed.
Figure 8:
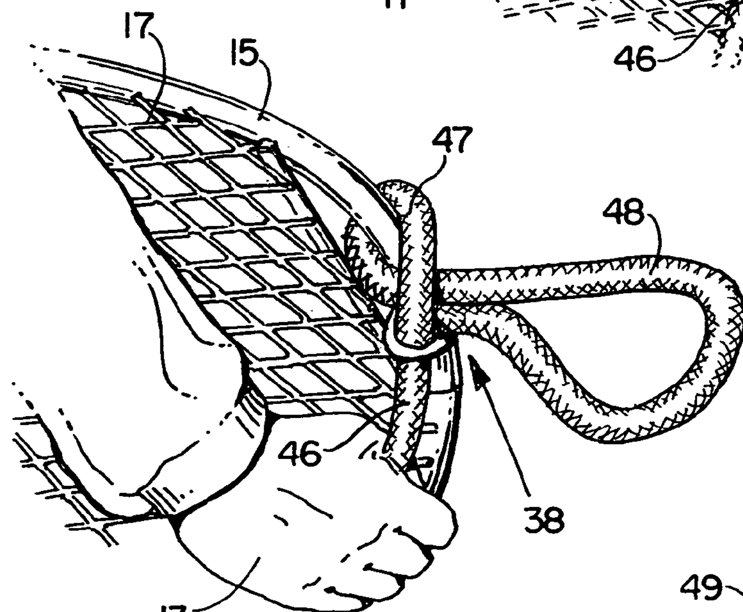
Figure 9:
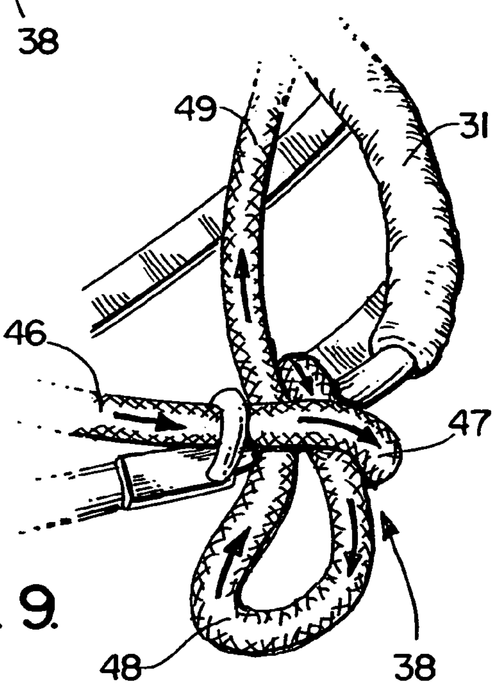
Figure 9A:
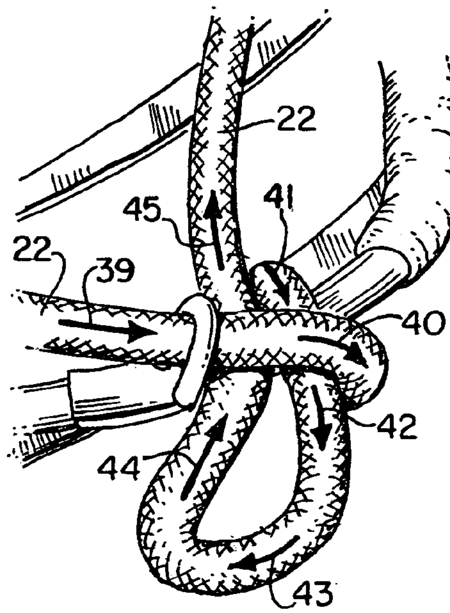
FIG. 9A is an enlarged view of one end portion of a cable that secures a platform to the tree and illustrating the adjustable connection that is made for changing orientation of a selected platform relative to the tree during climbing.
Figure 10:
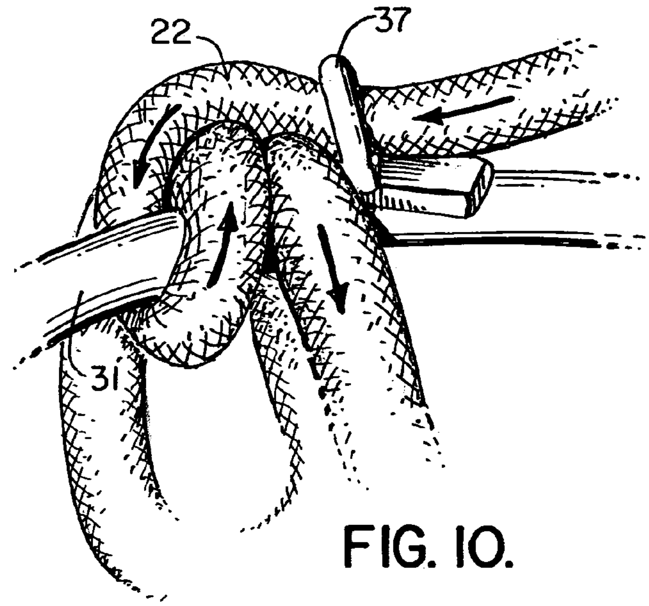
FIGS. 10, 11 and 12 are fragmentary perspective views illustrating the adjustable connection that is formed between one end portion of a cable and a platform.
Figure 11:
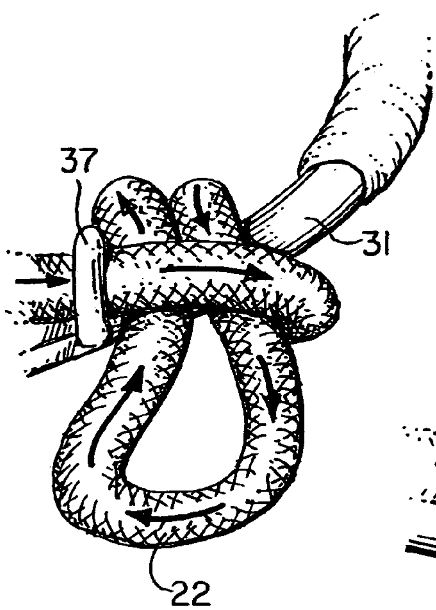
Figure 12:
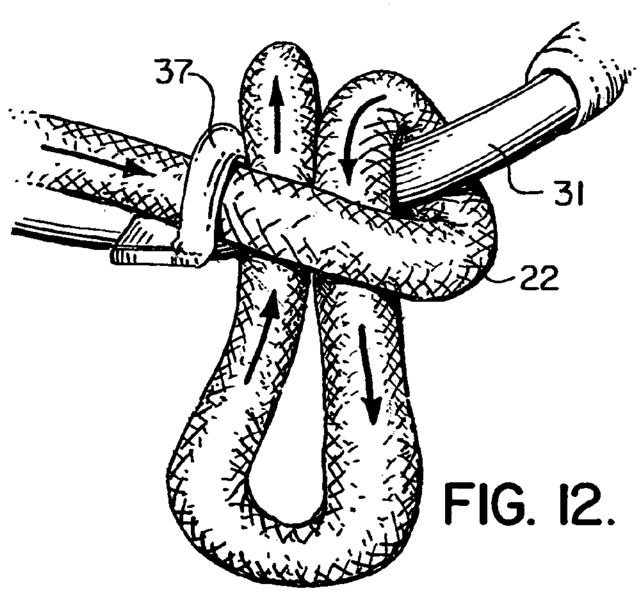

An eyelet 37 is provided at anchor point 25 through which cable 22 extends as shown in FIGS. 7, 8, 9, 9A and 10–15. The adjustable anchor point 28 can be in the form of knot 38, as shown in FIGS. 7–9, 9A and 10–15. In FIG. 9A, arrows 39–45 illustrate the path of rope 22 after it passes through eyelet 37.

For purposes of illustration, the cable 22 as it passes through eyelet 37 can be described as having a number of sections 46–49. The section 46 in FIGS. 7–12 is that portion of the cable 22 that is approaching the eyelet 37 from tree 14 in the direction of arrow 39. Cable section 47 is that portion of the cable that extends from eyelet 37 over half hitch section 48 and around frame 31 as illustrated by arrows 40, 41 in FIG. 9A. The half hitch section 48 extends from a position under rope section 47, forms a loop and extends under cable section 47 immediately adjacent to eyelet 37 as shown in FIG. 9A. Cable section 49 is that section of cable that extends from frame 31 and away from cable section 48, the section 49 being the extreme free end of the cable 22.

Figure 13:
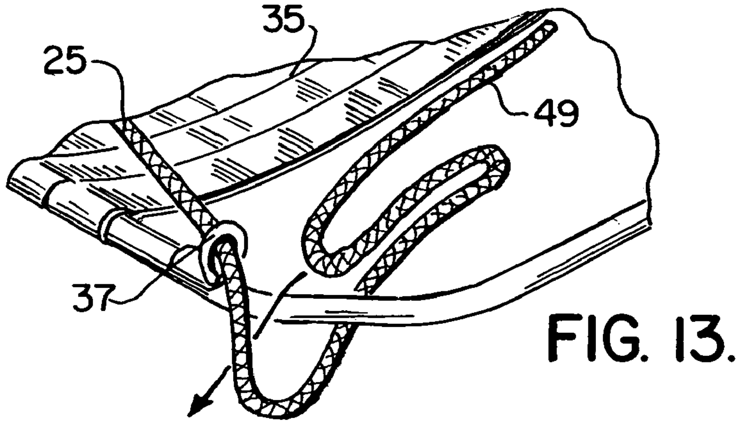
FIGS. 13, 14 and 15 are fragmentary perspective views illustrating the sequence of forming the adjustable connection that is formed between one end portion of a cable and a platform.
Figure 14:
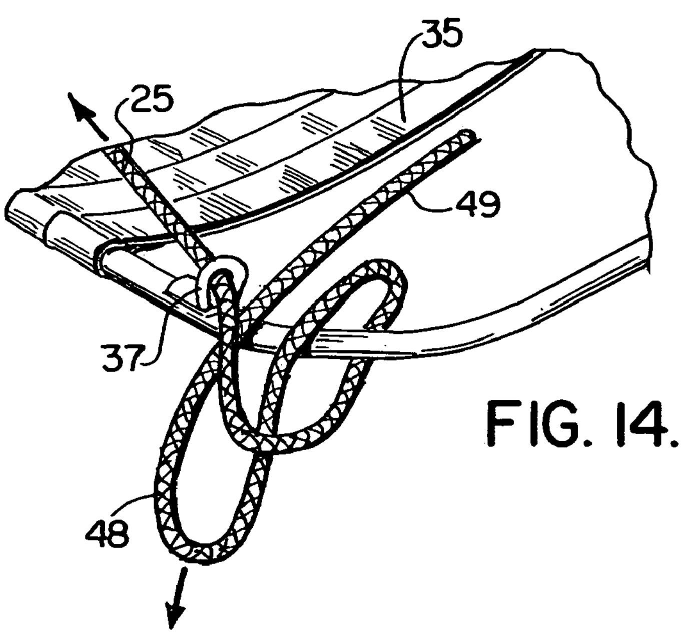
Figure 15:
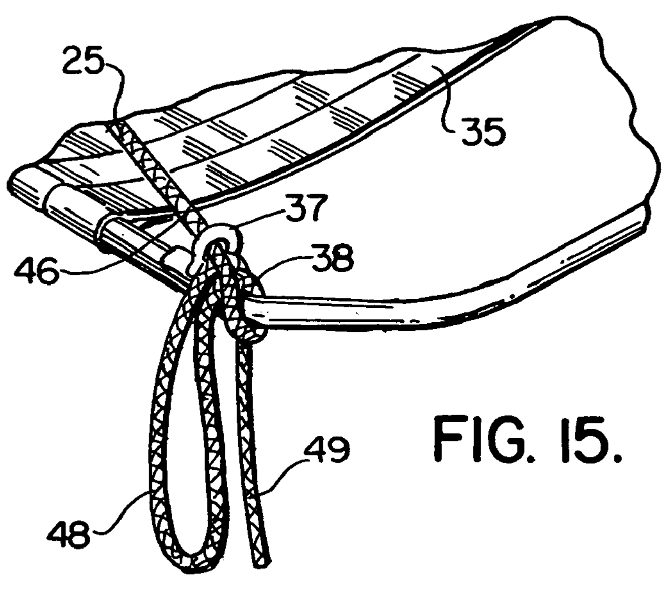

FIGS. 7 and 8 illustrate the simple adjustment that needs to be made in order to change the length of the cable 22 that extends from the first anchor point 27 around the tree 14 to the second anchor point 28. The hunter 13 simply loosens the knot 38 by pulling on the rope section 47, as shown in FIG. 7. Of course, this operation is performed when the hunter supports his or her weight on the other platform, that is the platform that is not being adjusted. For example, if the lower platform 12 is to be adjusted, the hunter sits upon the seat 35 of the upper platform 11 (or stands), and lifts the lower platform 12 upwardly to the hunter 13 using his or her feet. The hunter 13 then loosens the cable section 47 and adjusts the length of the half hitch or loop cable section 48 and then pulls on the rope section 46 as shown in FIG. 8, to retighten the knot 38. If the hunter 13 desires to adjust the length of the cable 22 that extends between the anchor points 27, 28 of the upper platform 11, this operation is repeated wherein the hunter supports his or her weight with the lower platform 12 by standing on it and simply lifts the upper platform 11 with his or her hands while the hunter 13 maintains a standing position. The adjustment can then be made as described above with respect to the lower platform 12. FIGS. 13–15 show an initial tying of cable 22 to frame 15 or 31 to preliminarily form knot 38, such as when replacing cable 22.

Figure 20:
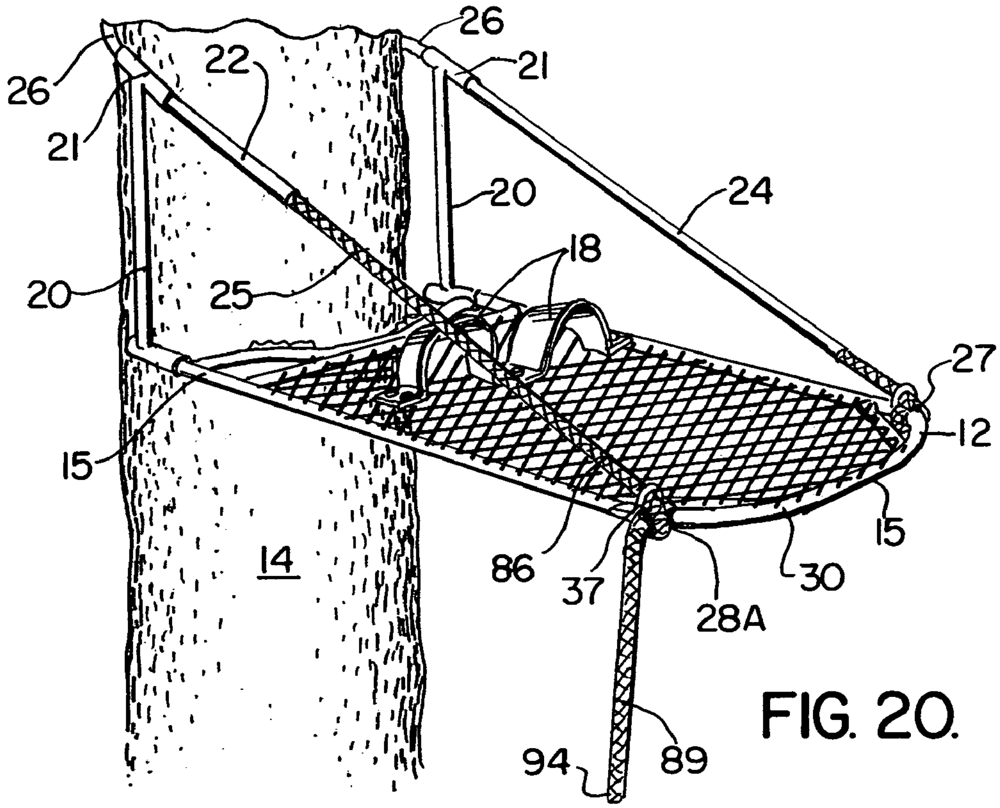
FIG. 20 is a perspective view of the preferred embodiment of the apparatus of the present invention, showing the lower platform connected to a tree using an eyelet and knot.
Figure 21:
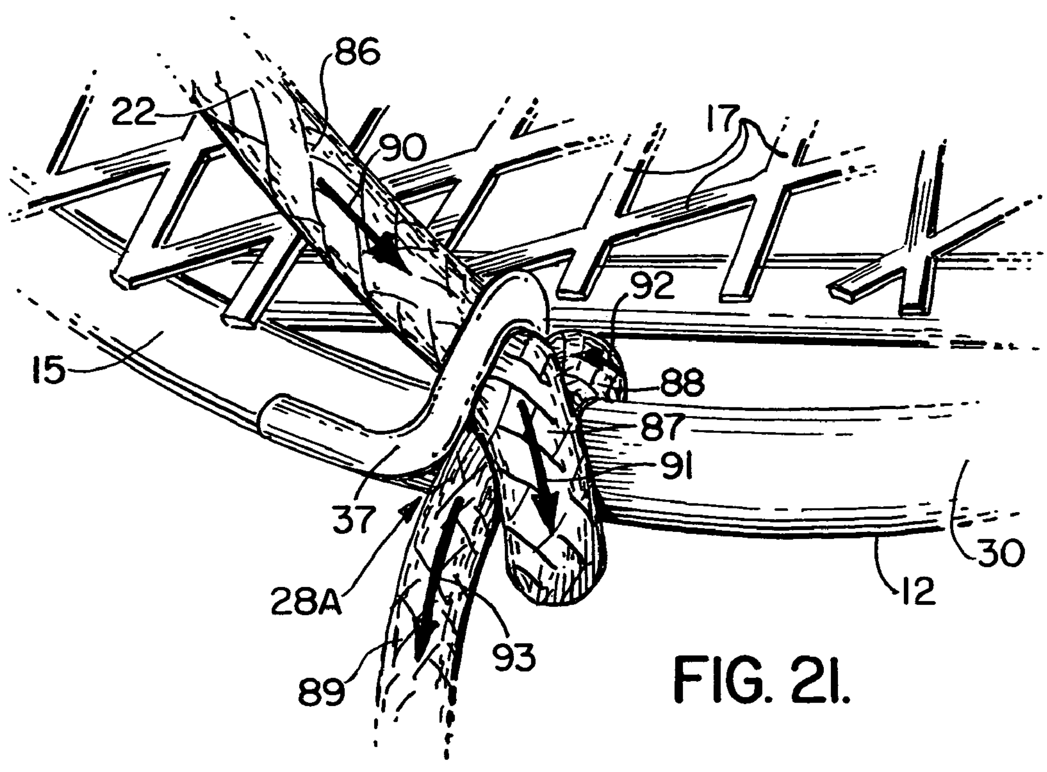
FIG. 21 is a fragmentary perspective view of the preferred embodiment of the apparatus of the present invention, showing the lower platform connected to a tree using an eyelet and knot.

In FIGS. 20 and 21, another knot arrangement is shown for attaching the cable 22 in an adjustable fashion to either of the selected platforms 11 or 12. In FIGS. 20 and 21, the lower platform 12 is shown attached to tree 14 using a cable 22, as with the embodiment shown in FIGS. 1–15. In FIGS. 20 and 21, a simplified anchor 28A is shown that does not require the loop cable section 48 in the embodiment of FIGS. 10–15. As with the embodiment of FIGS. 1–15, the lower platform 11 provides a frame 15 to which eyelet 37 is attached. Cable 22 is shown approaching eyelet 37 in FIGS. 20 and 21.

In order to complete the adjustable anchor 28A, the cable 22 is passed through eyelet 37, routed over the front 30 portion of frame 15 of platform 12 as shown in FIG. 21. To further describe the adjustable anchor 28A, the cable 22 as it approaches and attaches to frame 15 is designated with various cable sections 86, 87, 88, 89. The cable section 86 as indicated by arrow 90 is that portion of the cable 22 that spans between the tree 14 and the eyelet 37. The cable section 87 is that portion of the cable that has passed through eyelet 37 and which extends under the front 30 portion of frame 15 of lower platform 12, as indicated by arrow 91 in FIG. 21. The cable section 88 as indicated by arrow 92 is that portion of the cable 22 that passes under cable section 88 and next to eyelet 37 at a position spaced away from tree 14. The cable section 89 as indicated by arrow 93 is that portion of the cable 22 that extends from cable section 87 and eyelet 37 to cable free end 94.

When a hunter wants to adjust the position of platform 12 relative to tree 14, the hunter simply lifts the platform 12 upwardly using the foot straps 18 in the case of the lower platform 12 while sitting on the upper platform 11. This releases tension on the cable 22. A hunter simply loosens the adjustable anchor 28A and then pulls on the cable section 89 in order to shorten the distance that the cable spans between tree 14 and eyelet 37. This procedure is reversed if the hunter wants to elongated the cable 22 that spans between tree 14 and eyelet 37. Because the cable section 88 passes under the cable section 87, the cable section 88 is tightly wedged against the eyelet 37 when the hunter stands upon platform 17 preventing any slippage of the adjustable anchor 28A.

Figure 16:
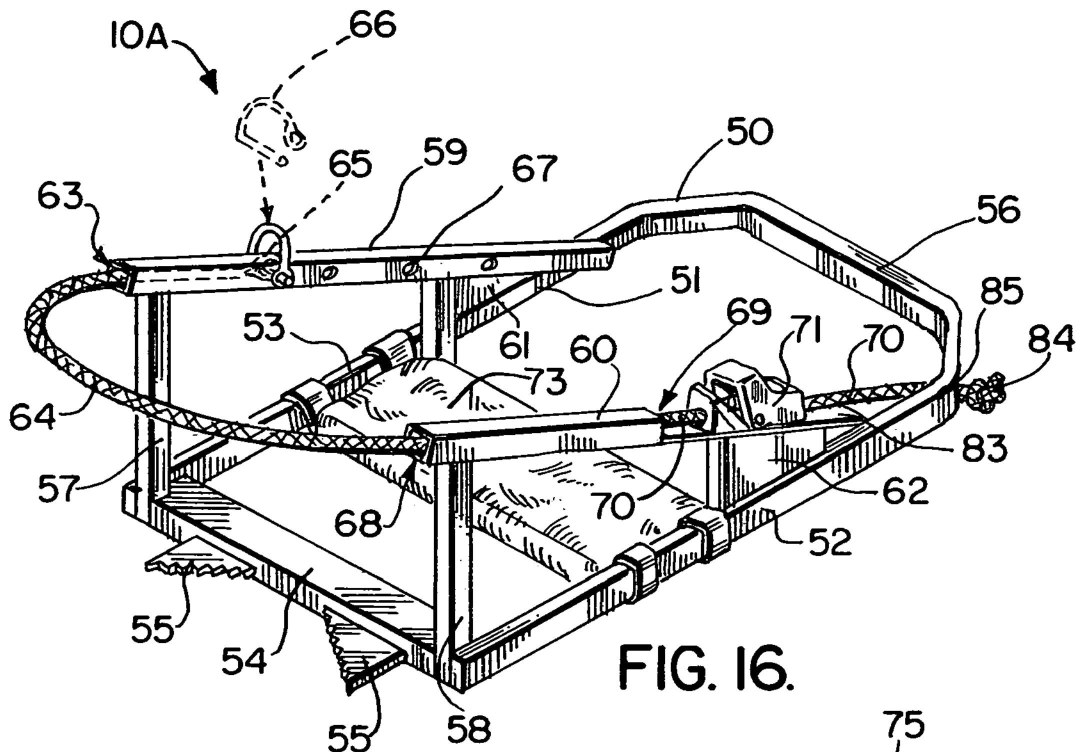
FIG. 16 is a perspective view of an alternate embodiment of the apparatus of the present invention.

An alternate embodiment of the apparatus of the present invention, designated generally by the numeral 10A is shown in FIG. 16. In FIG. 16, the upper platform 50 shown is similar to the upper platform 11 of the preferred embodiment of FIGS. 1–15. In FIG. 16, the platform 50 has a frame 51 that includes sides 52, 53, a tree engaging inner end portion 54 having blades 55 or a like tree engaging or tree gripping surface. The inner portion 54 spans between the sides 52, 53 as shown in FIG. 16. An outer end portion 56 spans between the sides 52, 53. The frame 51 can be of welded steel, welded aluminum or other structural material such as fiberglass or carbon fiber. A pair of upwardly extending generally vertically positioned struts 57, 58 extend upwardly and form a connection with left and right diagonally extending members 59, 60. Gusset plates can be provided at 61, 62 spanning between a side 52 or 53 and a diagonally extending member 59 or 60 as shown. Upper platform 50 has a seat 73. A lower platform would be used in combination with upper platform 50 to complete a tree climbing stand, with foot straps such as is shown and described with respect to the preferred embodiment of FIGS. 1–15. The lower platform is not shown, but would have the same cable, frame, and other components of platform 50, but have flooring and foot straps like those shown in FIGS. 1–5 and 5A.

Figure 18:
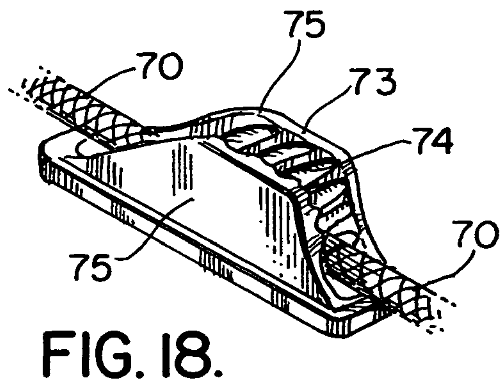
FIG. 18 is a partial perspective view of the alternate embodiment of the apparatus of the present invention illustrating an alternate cleat for use therewith.
Figure 17A:
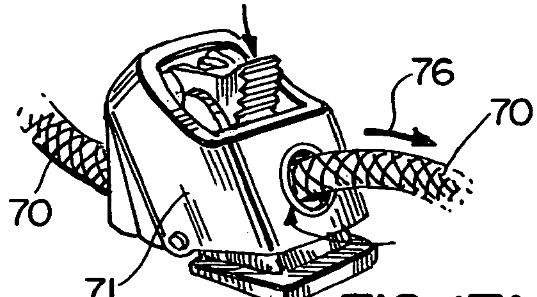
FIG. 17A and FIG. 17B is a fragmentary perspective view of the alternate embodiment of the apparatus of the present invention showing the cleat portion thereof.
Figure 17B:
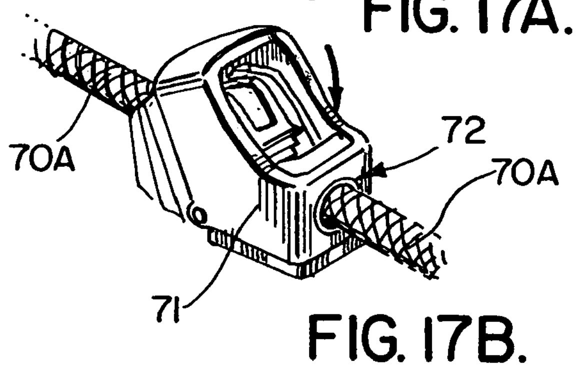
Figure 19:
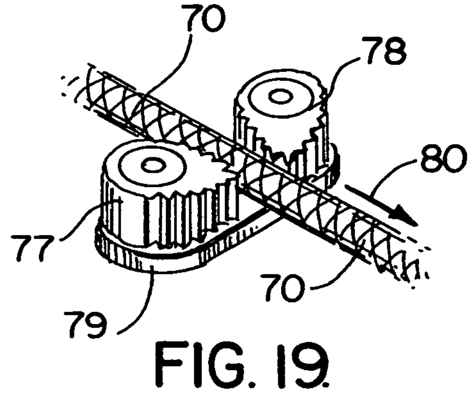
FIG. 19 is a partial perspective view of the alternate embodiment of the apparatus of the present invention and showing an alternate cleat for use therewith.

The side 59 can be provided with a hollow bore 63 that can be occupied by an end portion of cable 64 that is in the form of an eyelet 65. This enables the eyelet 65 to be secured at a selected position by placing a cotter pin or other locking pin member 66 through one of the adjustment holes 67 in the inclined member 59. The other inclined member 60 provides an open-ended bore 68 that can be occupied by an end portion of cable 64 that extends through the bore 68 and exits the bore 68 at position 69 shown in FIG. 16. In this fashion, a section of the cable 64 is exposed, the exposed section being designated by the numeral 70 in FIG. 16. The exposed section 70 passes through a cleat 71 that can be any of a number of commercially available cleats or any cleat device or like locking device that enables the hunter 13 to pull on the exposed section of cable 70 adjusting the position of the cable section 70 relative to the cleat 71 and thus adjusting the position of the cable 64 in relation to the tree 14 being climbed and with respect to the frame 51. A hunter thus pulls in the direction of arrow 76 in FIG. 17A as the hunter simultaneously lifts up on the frame 51 to relieve any tension in the cable 64. When the hunter then loads the frame by pushing down on the frame 51 or by sitting in the seat 73, tension is applied to the cable 64, the tensioned position being indicated by the numeral 70A in FIG. 17B. In this position, the cleat 71 tightly grips the rope or cable 64 preventing any slippage. Other forms of cleats are shown in FIGS. 18 and 19 that could be used with the apparatus o the present invention. In FIG. 18, a cleat 73 is provided that has a plurality of diagonally extending raised gripping surfaces 74 that hold a rope section 70 that is placed in between the opposed walls 75, 75 of the cleat 73. Such a cleat 73 as shown in FIG. 18 is commercially available, sold under the mark Camcleat and available at marine retailers such as Boater's World and West Marine.

In FIG. 19, the exposed end 70 of cable 64 is placed between the cams 77, 78 of cleat 79. The cleat 79 can be a commercially available sailing cleat that is manufactured under the mark Ronstan and sold by marine retailers such as West Marine and Boaters World. Cleat 79 allows the cable section 70 to move in the direction of arrow 80. Cams 77, 78 mounted on pivot pins 81 are spring loaded or biased to rotate toward each other. Each cam 77, 78 has teeth 82 to grip the cable 70 when tension is applied to the cable 70 such as when the hunter loads the platform frame 51 during climbing, sitting or standing.

A cleat can thus be used in place of the eyelet 21 and knot 38 shown in FIGS. 7–12 as an alternate embodiment of the method and apparatus of the present invention to adjustably secure an end portion 70 of the cable 64 while the stand 11A is attached to the tree in the operating positions of FIGS. 1–4. The cleats 71, 73, 79 would be attached to mounting plate 83 in about the same position as the eyelet 21 as an example. Such a cleat could be any marine or sailing cleat, such as, for example any of those cleats sold by Spinlock Limited of 41 Birmingham Road, Cowes Isle of Wight, England and disclosed in their catalog entitled "Spinlock—Deck Solutions Guide from the Experts in Rope Handling, 2002". Such Spinlock® cleats 71 can also be seen at the web site, www.spinlock.co.uk. Such a cleat 71 enables the hunter to pull on and manipulate an end portion 70 of the cable 64 in order to change the length of the cable that is under tension during use, and thus change the angle that the platform 11, 12 or 50 forms with the tree.

Other cleats 73, 74 can be employed (as examples) to enable adjustment of the length of cable that extends from the selected platform 11 or 12 or frame 15. A single cleat could be attached to one side of a platform 11 or 12 as shown, or two cleats could be employed on opposing sides of a platform 11 or 12. If a single cleat is used on one side of a platform 11 or 12, the other side of the platform could be anchored to the frame without adjustability, or could be adjustably connected to the frame using a locking pin that attaches to an eyelet at the end of the rope or cable, like the cable and locking pin adjustment used in the Louk patents listed above, and shown in FIG. 16.

In addition to the eyelet and cleats shown and described herein, other anchors, such as a winch, ratcheted winch, ratcheted sprocket, ratchet, grip, could be employed to attach the free end of a cable to the platform 11 or 12 or 50 when the user is able to grasp, manipulate, apply tension to or otherwise adjust the cable 22 or 64 and change its length according to the method of the present invention. If a chain is used in place of a cable 22 or 64, a cleat that grips the chain could be employed so that the hunter pulls on a free end of the chain that is exposed and the cleat (or winch, ratchet, grip) then is used to secure the chain once its position is correctly adjusted to ensure that the platform 11 or 12 or 50 is generally horizontally positioned.

PARTS LIST

The following is a list of suitable parts and materials for the various elements of the preferred embodiment of the present invention.

10 climbing tree stand
10A climbing tree stand
11 upper platform
12 lower platform
13 hunter

14 tree
15 frame
16 blade
17 flooring
18 foot attachment
19 elastic strap
20 upwardly extending strut
21 eyelet
22 cable
23 flexible cover
24 first end portion
25 second end portion
26 central portion
27 anchor point
28 adjustable anchor point
28A adjustable anchor point
29 inner end
30 outer end
31 frame
32 inner end
33 outer end
34 blade
35 seat
36 backpacking straps
37 eyelet
38 knot
39 arrow
40 arrow
41 arrow
42 arrow
43 arrow
44 arrow
45 arrow
46 cable section
47 cable section
48 cable section
49 cable section
50 upper platform
51 platform frame
52 right side
53 left side
54 inner end portion
55 tree engaging blade
56 outer end portion
57 vertically extending strut
58 vertically extending strut
59 diagonally extending member
60 diagonally extending member
61 gusset plate
62 gusset plate
63 bore
64 cable
65 eyelet
66 locking pin
67 opening
68 bore
69 position
70 exposed end portion
71 cleat
72 bore
73 cleat
74 diagonally extending ridge
75 cleat side
76 arrow
77 cleat
78 cam
79 base
80 arrow
81 pivot pin
82 teeth
83 mounting plate
84 retainer stop
85 opening
86 cable section
87 cable section
88 cable section
89 cable section
90 arrow
91 arrow
92 arrow
93 arrow The foregoing embodiments are presented by way of example only; the scope of the present invention is to be limited only by the following claims.

What is claimed is:

1. A climbing tree stand for enabling a hunter to climb a tree to an elevated position comprising:

a) upper and lower climbing platform members, each having a front end portion for engaging the tree to be climbed, a rear end portion, and opposing sides connecting said front and rear end portions;

b) each platform member being generally rectangular, including a frame having left and right side members, a front portion, a rear portion and a plurality of corners, said frames each having first and second strut members each having a first end coupled to the platform adjacent the front end thereof and, respectively, on said opposite sides of the platform, each strut member having an eyelet;

c) a flexible non-metallic rope connector cable that is capable of being knotted, secured to each of the platform members for extending around but not completely encircling the tree to be climbed during use, the cable engaging the eyelets, for holding the platform to the tree so that as the weight of the hunter is applied to the platform member, the flexible connector tightly engages the tree on which the tree stand is mounted;

d) wherein the cable has at least one accessible end portion that is accessible to the hunter so that tension can be applied by the hunter to said accessible end portion and providing an adjustment that enables a hunter to adjust the length of the cable during climbing by applying tension to shorten the length of cable that extends between the frame and the tree; and e) an anchor that holds the cable relative to the platform after adjustment by the hunter, the anchor including a first portion mounted on the platform member that has a restricted opening that the rope passes through, and a second portion that is formed by the cable extending around a part of the frame next to a corner and two overlapping sections of the cable, said first and second portions being wedged tightly together as the weight of the hunter is applied to the platform member; and f) wherein the upper and lower platform are separate so that the hunter can adjust the cable length for the cable of one of said upper and lower platform while supporting his or her weight with the other of said upper and lower platform.

2. A climbing tree stand as in claim 1 wherein the flexible cable connector is adjustable in length relative to at least one of said platform members on both sides of said platform member.

3. A climbing tree stand as in claim 1 wherein said first and second strut members interact with said flexible connector so that said first and second strut members move relative to a tree on which the tree stand is mounted.

4. A climbing tree stand as in claim 3 wherein the cable has a middle section for engaging the tree being climbed and two end sections.

5. A climbing tree stand as in claim 1 wherein at least some portions of each of said platform arc of hollow of tubing material.

6. A climbing tree stand as in claim 1 wherein said front portion includes a tree support structure connected to and extending across said platform member so that said support structure will abut the tree to be climbed when the tree stand is in operating, climbing position.

7. A climbing tree stand as in claim 6 wherein said platform member includes at least one cross-member fixed to and extending across said platform member.

8. A climbing tree stand as in claim 1 further including one or more tree engaging members fixed to said platform member.

9. A climbing tree stand as in claim 1 further including at least one cross-frame support member on the platform member.

10. A climbing tree stand as in claim 9 wherein one of said cross-frame support members is comprised of one of a flexible seat.

11. A climbing tree stand as in claim 4 wherein said flexible cable has a tensioned length during use that is defined by said middle section and the distances between the middle section and points of attachment of the end sections to the platform member.

12. A climbing tree stand as in claim 1 wherein said flexible connector cable is secured to the platform member next to the rear end portion.

* * * * *